Sept. 22, 1925.
F. W. ADSIT
1,554,696
MACHINE FOR EXTRUDING SOFT METAL
Filed April 20, 1923   2 Sheets-Sheet 1
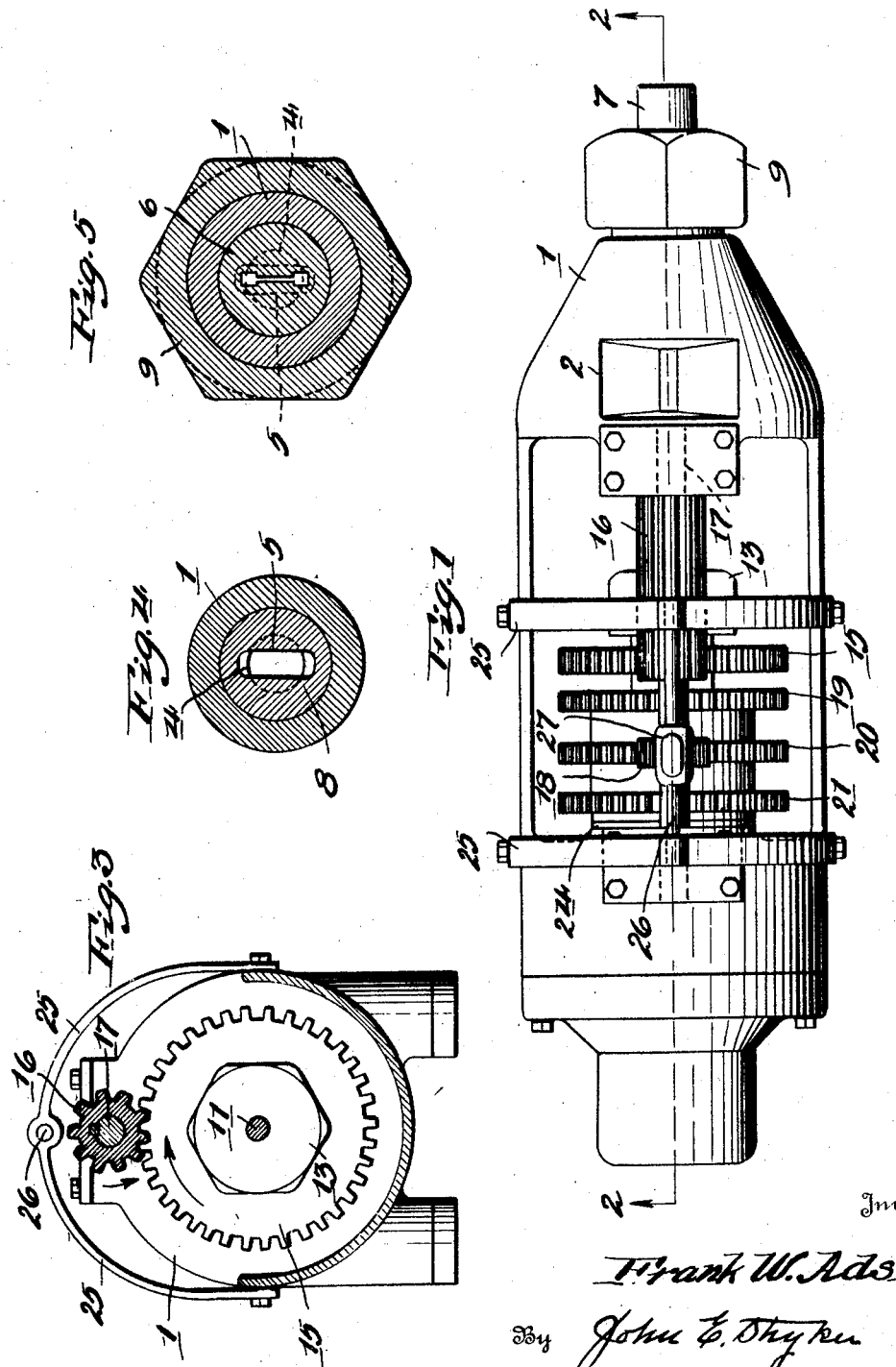
Inventor
Frank W. Adsit,
By John E. Thyker
his Attorney

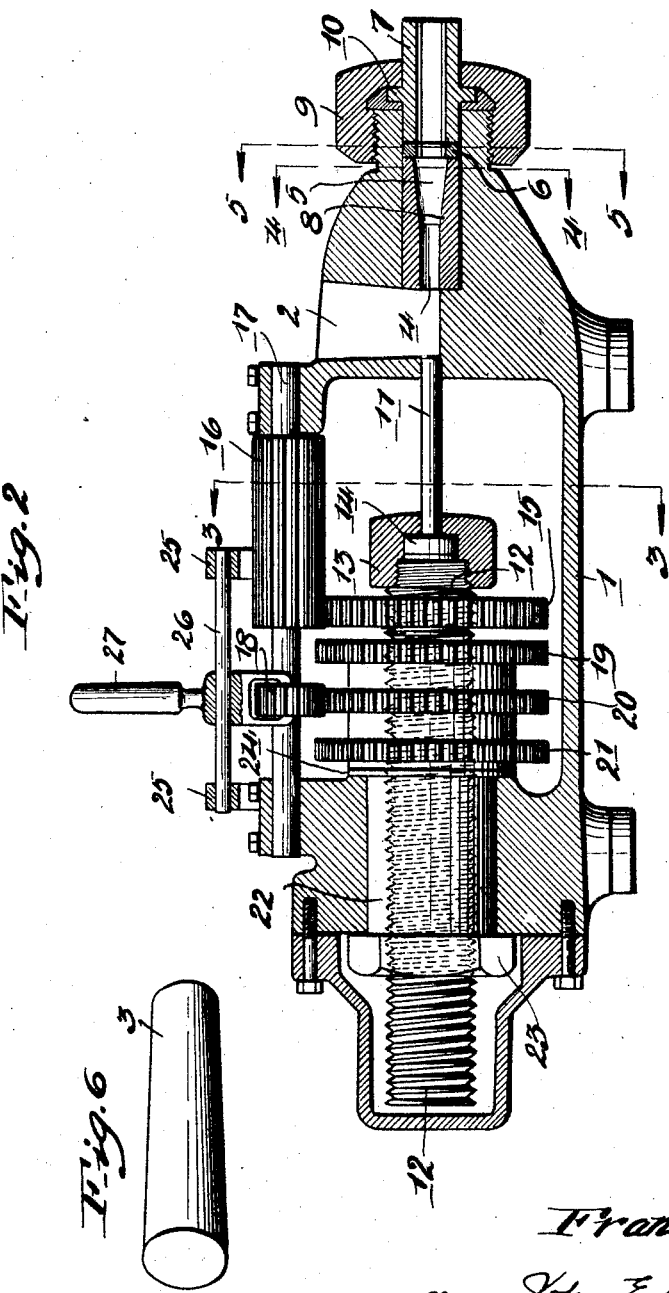

Patented Sept. 22, 1925.

1,554,696

UNITED STATES PATENT OFFICE.

FRANK W. ADSIT, OF ST. PAUL, MINNESOTA.

MACHINE FOR EXTRUDING SOFT METAL.

Application filed April 20, 1923. Serial No. 633,466.

*To all whom it may concern:*

Be it known that I, FRANK W. ADSIT, a citizen of the United States, residing at St. Paul, in the county of Ramsey and State of Minnesota, have invented new and useful Improvements in Machines for Extruding Soft Metal, of which the following is a specification.

This invention relates to machines for extruding soft metal whereby bars of almost any desired cross sectional shape and length may be formed.

Heretofore, hot metal has been extruded but the machines in common use for this purpose are cumbersome and expensive and are usually operated by hydraulic pressure. The operation of these machines is rendered more difficult and complicated by the necessity of first melting the metal before it is delivered to the machines.

It is my object to obviate these defects and to produce regular, strong bars at a greatly reduced cost.

More particularly, it is my object to provide an extremely simple and compact machine adapted to receive cold bars or slugs of soft metal and to give them the desired cross sectional shape without first reducing the metal to molten form.

My improved machine is particularly adapted to make printer's plate mounting equipment from soft metal, such as type metal, but it will be evident that the machine may be used to great advantage wherever soft metal bars or plates of peculiar cross sectional shape are required.

The accompanying drawings illustrate what I at present believe to be the best form of my device. Referring to the drawings; Fig. 1 is a plan view of my improved extruding machine; Fig. 2 is a section taken on the line 2—2 of Fig. 1; Fig. 3 is a section taken on the line 3—3 of Fig. 2; Fig. 4 is a section taken on the line 4—4 of Fig. 2; Fig. 5 is a section taken on the line 5—5 of Fig. 2 and Fig. 6 is a detail perspective view of a suitable slug or soft metal bar which is placed in the machine and extruded.

In the drawings I have used the numeral 1 to indicate a stationary frame which supports the several moving parts of the machine. A hopper 2, formed in the frame, is adapted to receive cold slugs 3 (Fig. 6) of soft, malleable metal. Communicating with the bottom of the hopper 2 is a chamber 4 formed to freely receive the slugs 3 and this chamber opens in to a tapered approach passageway 5 leading to a forming die 6. From the die 6 a straightening die 7 extends to the delivery end of the machine. The chamber 4 and approach passageway 5 are formed in a cylindrical die 8, which fits snugly in a recess in the frame 1. The dies 6 and 7 are also cylindrical on their external surfaces to fit the recess in the frame 1 and all of said dies 6, 7 and 8 are held firmly within the frame by a large nut 9 threaded on a projection of the frame 1. This nut 9 engages an annular shoulder 10 formed on the die 7, a suitable packing ring being placed between said shoulder 9 and the end of the frame 1.

The approach passageway 5 is formed so as to gradually reduce the cross sectional area of the slug 3 as it is forced, as hereafter described, from the chamber 4 to the die 6. As clearly shown in Figs. 2, 4, and 5, the passageway 5 is arranged with its end adjacent to the die 6, to register with an I-shaped aperture in the latter die and said passageway 5 is formed to effect a uniform flow of metal through the die 6. The aperture in the straightening die is also I-shaped in cross section and communicates with the aperture in the die 6.

The following described mechanism is provided to force the metallic slugs 3 from the chamber 4 through the above described forming dies: A plunger 11 is mounted in axial alignment with the chamber 4 and is journaled in the frame 1 near the bottom of the hopper 2. The plunger 11 is rigidly secured to the end of a large screw 12 by a nut 13 which engages a mushroom head 14 on the plunger 11. Rigidly secured to the screw 12, near the nut 13, is a gear 15 adapted to be driven by a pinion 16 on a drive shaft 17. The latter shaft is journaled in suitable bearings in the frame 1 and carries a pinion 18 which is splined on said shaft so as to be revoluble therewith and slidable longitudinal thereon. The pinion 18 has the same number of teeth as the pinion 16 and is arranged to mesh with any one of three gears 19, 20 and 21. The gear 20 has the same number of teeth as the gear 15, while the gear 19 has fewer teeth and the gear 21 has more teeth than said gear 15. Thus, in the embodiment shown, the gears 15 and 20 are each formed with 34 teeth, while the gear 19 has 33 teeth and the gear 21 has 35 teeth. The gears 19, 20 and 21 are integral with each other and also with a long sleeve 22 which is journaled in the frame 1. A large thrust nut 23 threaded on the sleeve 22 is adapted to prevent movement of said sleeve out of the bearing in the frame 1 in one direction and a bronze washer 24 is arranged to receive end thrust at the opposite end of the sleeve 22. The screw 12 is threaded axially in the sleeve 22 and in the gears 19, 20 and 21. A pair of brackets 25 support a horizontal rod 26 above the shaft 17 for a gear shift lever 27. This lever is formed at its lower end to engage the pinion 18 so that said pinion may be selectively brought into engagement with any one of the gears 19, 20 and 21.

Operation.

In operation the shaft 17 is continuously driven by any suitable means so that the gear 15 together with the large screw 12 is rotated. When the pinion 18 is in mesh with any one of the gears 19, 20 or 21, the sleeve 22 will also be rotated. Assuming the position of the several parts to be shown in Fig. 2, the gears 15 and 20 having an equal number of teeth, the screw 12 and sleeve 22 will be driven at the same speed so that there will be no longitudinal movement of said screw and the plunger 11.

Assuming the direction of rotation to be as indicated in Fig. 3; to advance the plunger 11 into the chamber 4 it is only necessary to move the pinion 18 into mesh with the gear 19 by manipulating the lever 27. As the gear 19 has fewer teeth than the gear 15, the threaded sleeve 22 will now be driven at a slightly higher rate of speed than the screw 12, with the result that said screw and the plunger 11 will be moved to the right (Fig. 2). A slug 3 from the hopper 2 is thus pushed into the chamber 4 and thence will be forced through the passageway 5 to the forming die 6 and out through the straightening die 7.

When the plunger 11 reaches the end of the chamber 4, the pinion 18 is shifted to mesh with the gear 21. The sleeve 22 is now rotated at a slightly lower rate of speed than the screw 12 so that said screw is now advanced to the left (Fig. 2) to withdraw the plunger 11 to starting position. Another slug 3 is now placed or drops to the end of the plunger 11 and the gear 18 is again shifted to mesh with the gear 19. The second slug is now pressed upon the end of the first slug with such force and in such a manner that a union takes place between the first and second slugs which is not perceptible in the finished bar, i. e. the two slugs become integral. As the end of the power stroke, the plunger 11 is again reversed as described above and the operation is repeated to make a bar of the desired length. It will be evident that during the reciprocating movement of the screw 12, the gear 15 will slide longitudinally in continuous engagement with the long pinion 16.

Important features of my device are the formation and arrangement of the forming die 6 and straightening die 7, by which a perfectly regular, straight bar is obtained, and of the approach die 8, which insures uniform flow and pressure through the die 6. While in the drawings I have illustrated dies adapted to form a bar I-shaped in cross section, it will be obvious that these dies may be replaced by others to make different shaped bars without departing from the spirit of my invention.

Having described my invention what I claim as new and desire to protect by Letters Patent is:

1. An extruding machine comprising a chamber adapted to receive soft metal to be extruded, a die formed with an aperture in connection with said chamber, said aperture being substantially smaller than said chamber, a plunger formed to fit said chamber, and threaded means for thrusting said plunger into said chamber to thereby extrude metal through said aperture.

2. An extruding machine comprising a frame, a chamber in said frame adapted to receive soft metal to be extruded, a forming die having an aperture in communication with said chamber, said aperture being substantially smaller than said chamber, a screw movable longitudinally in said frame, a plunger adapted to be actuated by said screw and formed to fit said chamber, and means for actuating said screw to thrust said plunger through said chamber to thereby extrude metal therein through said aperture.

3. An extruding machine comprising, a frame, a screw revolubly mounted in said frame, a plunger on one end of said screw, a hopper adapted to deliver bars of soft metal to the end of said plunger, a chamber formed to fit said plunger and arranged to receive said bars from said hopper, a die formed with an aperture in communication with said chamber, and means in engagement with said screw for thrusting said plunger into said chamber.

4. An extruding machine comprising, a frame, a screw revolubly mounted in said frame, a plunger on one end of said screw, a hopper adapted to deliver bars of cold metal to the end of said plunger, a chamber formed to fit said plunger and arranged to receive said bars from said hopper, a die formed with an aperture in communication with said chamber, means for rotating said screw and means in engagement with said screw for thrusting said plunger into said chamber.

5. An extruding machine comprising, a frame, a screw revolubly mounted in said frame, a plunger on one end of said screw, a hopper adapted to deliver bars of soft metal to the end of said plunger, a chamber formed to fit said plunger and arranged to receive said bars from said hopper, a die formed with an aperture in communication with said chamber, a gear rigidly mounted on said screw, means for rotating said gear and means threaded on said screw for thrusting said plunger through said chamber.

6. An extruding machine comprising a chamber adapted to receive a bar of soft metal, a forming die having an aperture in communication with said chamber, said aperture being substantially smaller than said chamber, a second die disposed between said chamber and forming die to reduce the size of said bar as it approaches said forming die, a plunger formed to fit said chamber, a screw adapted to actuate said plunger, a sleeve threaded on said screw, and means for rotating said screw and sleeve at different speeds to thrust said plunger through said chamber and thereby extrude said bar through said aperture.

7. An extruding machine comprising, a frame, a chamber in said frame adapted to receive a bar of cold metal, a die formed with an aperture in communication with said chamber, said aperture being substantially smaller than said chamber, a plunger formed to fit said chamber, a screw arranged in axial alignment with said plunger to actuate the same, a sleeve threaded on said screw and revolubly mounted in said frame, and means for rotating said sleeve and screw at different speeds.

In testimony whereof, I have hereunto signed my name to this specification.

FRANK W. ADSIT.